US011576025B1

(12) United States Patent
Lan (10) Patent No.: US 11,576,025 B1
(45) Date of Patent: Feb. 7, 2023

(54) PROVIDING USER EQUIPMENT (UE) LOCATION RAPIDLY AND ACCURATELY DURING AN EMERGENCY CALL

(71) Applicant: T-Mobile USA, Inc., Bellevue, WA (US)

(72) Inventor: Wei-Ming Lan, Newcastle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 45 days.

(21) Appl. No.: 17/340,456

(22) Filed: Jun. 7, 2021

(51) Int. Cl.
*H04W 4/90* (2018.01)
*H04W 64/00* (2009.01)
*H04W 4/029* (2018.01)

(52) U.S. Cl.
CPC ............. *H04W 4/90* (2018.02); *H04W 4/029* (2018.02); *H04W 64/006* (2013.01)

(58) Field of Classification Search
CPC ..... H04W 4/90; H04W 4/029; H04W 64/006; H04W 64/00; G01S 19/45
See application file for complete search history.

(56) References Cited

U.S. PATENT DOCUMENTS

2012/0083241 A1* 4/2012 Annamalai ........... H04W 4/023 455/456.1
2014/0294180 A1* 10/2014 Link, II ................. G08G 1/205 380/270

* cited by examiner

*Primary Examiner* — Umair Ahsan (57) ABSTRACT

A solution for providing user equipment (UE) location during an emergency call (e.g., an E911 call) includes: receiving, at a positioning node (e.g., a gateway mobile location center (GMLC)), a notification of an emergency call; requesting, by the positioning node, an approximated location of the UE; requesting, from the UE, a refined location of the UE, wherein the refined location has a higher expected accuracy than the approximated location; receiving the approximated location; based on at least the approximated location, selecting an emergency service responder point (e.g., a public safety answering point (PSAP)) from among a plurality of emergency service responder points; instructing a call routing destination of the emergency call as the selected emergency service responder point; receiving the refined location; and transmitting the refined location to the selected emergency service responder point. A rapid approximate location enables selecting the PSAP while waiting for a more accurate location report.

20 Claims, 5 Drawing Sheets

PROVIDING USER EQUIPMENT (UE) LOCATION RAPIDLY AND ACCURATELY DURING AN EMERGENCY CALL

BACKGROUND

When someone requires assistance, and places an emergency phone call, it is often important for emergency responders to know the location of that person. A cellular device, for example a user equipment (UE), has logic to determine and automatically report its location over the cellular network to which it is connected, when making an emergency call, such as an enhanced 911 (E911) call. The UE may use a global positioning system (GPS) receiver or assisted GPS (AGPS) to determine its location. The location of the UE is routed to a public safety answering point (PSAP), where the emergency call is answered, and the person using the UE may make a report on the emergency.

Unfortunately, obtaining accurate location information from the UE may require an extended period of time, relative to the time criticality of many emergency call scenarios. For example, determining location with an assisted global positioning system (AGPS) may require 20 seconds or more. A potentially more rapid solution that uses the known location of the cellular base station that is serving the UE risks sending the emergency call to the incorrect PSAP, when the cell size crosses boundaries of PSAP jurisdiction. This incorrect routing introduces undesirable delay.

SUMMARY

The following summary is provided to illustrate examples disclosed herein, but is not meant to limit all examples to any particular configuration or sequence of operations.

A solution for providing user equipment (UE) location during an emergency call (e.g., an E911 call) includes: receiving, at a positioning node (e.g., a gateway mobile location center (GMLC)), a notification of an emergency call; requesting, by the positioning node, an approximated location of the UE; requesting, from the UE, a refined location of the UE, wherein the refined location has a higher expected accuracy than the approximated location; receiving the approximated location; based on at least the approximated location, selecting an emergency service responder point (e.g., a public safety answering point (PSAP)) from among a plurality of emergency service responder points; instructing a call routing destination of the emergency call as the selected emergency service responder point; receiving the refined location; and transmitting the refined location to the selected emergency service responder point. A rapid approximate location enables selecting the PSAP while waiting for a more accurate location report.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

A solution for providing user equipment (UE) location during an emergency call (e.g., an E911 call) includes: receiving, at a positioning node (e.g., a gateway mobile location center (GMLC)), a notification of an emergency call; requesting, by the positioning node, an approximated location of the UE; requesting, from the UE, a refined location of the UE, wherein the refined location has a higher expected accuracy than the approximated location; receiving the approximated location; based on at least the approximated location, selecting an emergency service responder point (e.g., a public safety answering point (PSAP)) from among a plurality of emergency service responder points; instructing a call routing destination of the emergency call as the selected emergency service responder point; receiving the refined location; and transmitting the refined location to the selected emergency service responder point. A rapid approximate location enables selecting the PSAP while waiting for a more accurate location report.

Aspects of the disclosure improve the speed of emergency calls placed over cellular networks, and therefore improve public safety, by requesting an approximated location of the UE (a rapid location solution) and requesting a refined location of the UE, wherein the refined location has a higher expected accuracy than the approximated location. The emergency service responder point is selected based on at least the approximated location, so that the emergency call routing is able to commence prior to receiving the (possibly slower) more accurate refined location. By beginning the emergency call routing while the UE is still determining the more accurate refined location, precious time may be saved for the user making the emergency call.

The location of a UE is used for at least two different purposes: (1) routing the emergency call to the proper emergency service responder point, and (2) routing emergency responders to the user's location. Fortunately, the first purpose, routing the emergency call to the proper emergency service responder point, has a relaxed accuracy requirement relative to the second purpose, and the second purpose, routing emergency responders to the user's location, has reduced time criticality relative to the first purpose. This introduces a beneficial trade-off. A more rapid location estimate may be used for routing the emergency call to the proper emergency service responder point, even if the accuracy is not the highest that is achievable from the UE, and a more accurate location estimate may be used for routing emergency responders to the user's location, even if there is a time delay of several seconds. The more rapid location estimate is an approximated location of the UE, and the more accurate location estimate is a refined location of the UE.

In some examples, the approximated location of the UE is available in about 5 seconds, whereas the refined location of the UE is available in about 20 seconds or longer. However, the use of the approximated location of the UE for routing the emergency call enables an operator at the proper emergency service responder point to receive the call while the UE is still working on determining the refined location. The refined location should then be available for the operator at the proper emergency service responder point within a matter of seconds. And further, this solution reduces the risk of a delay caused by routing the emergency call to an incorrect emergency service responder point, which may occur when the emergency service responder point is selected based on the identify and location of the serving cellular base station, and the cell coverage of the serving cellular base station spans the jurisdiction of multiple emergency service responder points. In some scenarios, the cell coverage of a cellular base station may extend for miles (e.g., 5 miles) from the location of the base station antenna tower.

Global positioning system (GPS) and assisted GPS (AGPS) solutions provide accurate locations, but typically perform better in outdoor settings (e.g., within 10 seconds) than in indoor settings (e.g., 24 seconds). Enhanced cell identification (ECID) and adaptive ECID (AECID) solutions involve a UE performing radio measurement of cellular signals and reporting the measurements to an evolved serving mobile location center (eSMLC) or a location management function (LMF), which then calculates the UE location based on the reported measurements. ECID, although not as accurate as AGPS, may be available within 5 seconds. Thus, one approach is to route an emergency call to an emergency service responder point based on using ECID for the approximated location, while waiting for AGPS to provide the refined location.

Figure 1:
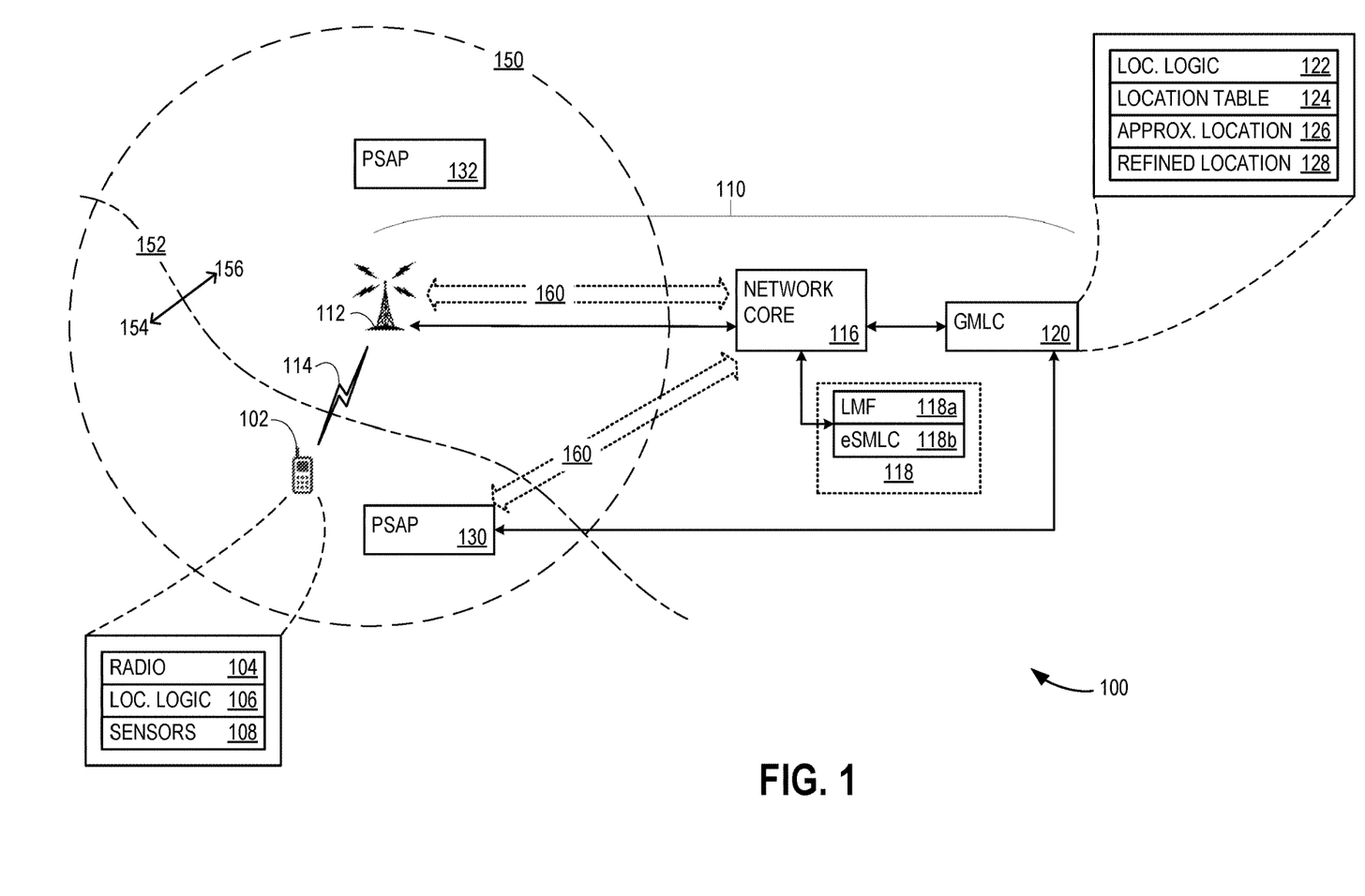
FIG. 1 illustrates an exemplary arrangement that advantageously provides user equipment (UE) location rapidly and accurately during an emergency call.

With reference now to the figures, FIG. 1 illustrates an arrangement 100 that provides a location for UE 102 rapidly and accurately during an emergency call (e.g., an enhanced 911 (E911) call) through a cellular network 110. UE 102 communicates with a serving base station 112 over an air interface 114. Base station 112 is part of cellular network 110 and either hosts or communicates with an LMF 118a and/or an eSMLC 118b. LMF 118a and/or eSMLC 118b calculate network-based location estimates of mobile stations, such as UE 102. Together, LMF 118a and eSMLC 118b are referred to as network location node 118. Cellular network 110 also includes a network core 116, and a positioning node 120 (e.g., a GMLC) that holds UE position information for other network elements and external elements, such as an emergency service responder point 130 (e.g., a PSAP) and an emergency service responder point 132 (e.g., another PSAP).

Emergency service responder points 130 and 132 are emergency call answering centers that receive emergency calls from UEs (such as UE 102 and other UEs), and at which the operators need location information in order to dispatch emergency services. In some examples, UEs reach a PSAP using an emergency service routing key (ESRK) number. An ESRK number is used for routing an E911 call to the appropriate PSAP. In some examples, an emergency services routing digit (ESRD) identifies the cell site and sector of the call origination in a wireless call scenario. The ESRD and ESRK define a route to the proper PSAP. The ESRK and/or the ESRD may be signaled to a PSAP for use in identifying the emergency service agencies (e.g., police, fire, medical) associated with the location of a UE.

Base station 112 supports a cell 150 which is large enough that the area within cell 150 covers portions of a jurisdiction 154 for emergency service responder point 130 and a jurisdiction 156 for emergency service responder point 132. That is, an emergency that occurs within jurisdiction 154 should be handled by emergency service responder point 130, and an emergency that occurs within jurisdiction 156 should be handled by emergency service responder point 132. Jurisdictions 154 and 156 are separated by a jurisdictional boundary 152. As illustrated, UE 102 is within jurisdiction 154. However, because base station 112 is located within jurisdiction 156 of emergency service responder point 132, an emergency call routing scheme that uses merely the cell identification (CID) of base station 112 may route an emergency call from UE 102 to emergency service responder point 132, rather than emergency service responder point 130, where the emergency call from UE 102 should be routed. This incorrect routing introduces an undesirable delay, while operators at emergency service responder point 132 determine that the emergency call should have gone to emergency service responder point 130, and attempt to forward the emergency call.

An emergency call 160 is shown as being properly routed from UE 102 to emergency service responder point 130, according to the disclosure herein. UE 102 has a radio 104 (e.g., a cellular radio), a location logic 106, and a sensor suite 108. Radio 104 is used for supporting air interface 114. Sensor suite 108 may include a timer for measuring timing events in support of ECID and AECID, a GPS receiver for supporting GPS and AGPS location determination, other wireless radios (e.g., WiFi) for locating UE 102 based on detecting other nearby base stations with known positions. Sensor suite 108 may further include an assisted global navigation satellite system (A-GNSS) sensor, WiFi-Crowdsourcing device-based hybrid (DBH), a z-axis (barometric pressure) sensor for uncompensated barometric pressure (UBP) measurements, and other sensors that may assist with determining an approximated location 126 and a refined location 128.

Positioning node 120 has a location logic 122 that requests approximated location 126 and refined location 128 from UE 102 and/or network location node 118 (representing LMF 118a and eSMLC 118b). Positioning node 120 uses a location table 124 to identify the emergency service responder point jurisdiction in which a particular location resides. For example, when positioning node 120 receives approximated location 126, positioning node 120 uses location table 124 to identify that approximated location 126 is within jurisdiction 154 of emergency service responder point 130. When positioning node 120 receives refined location 128, positioning node 120 stores refined location 128 until emergency service responder point 130 requests refined location 128.

Figure 2:
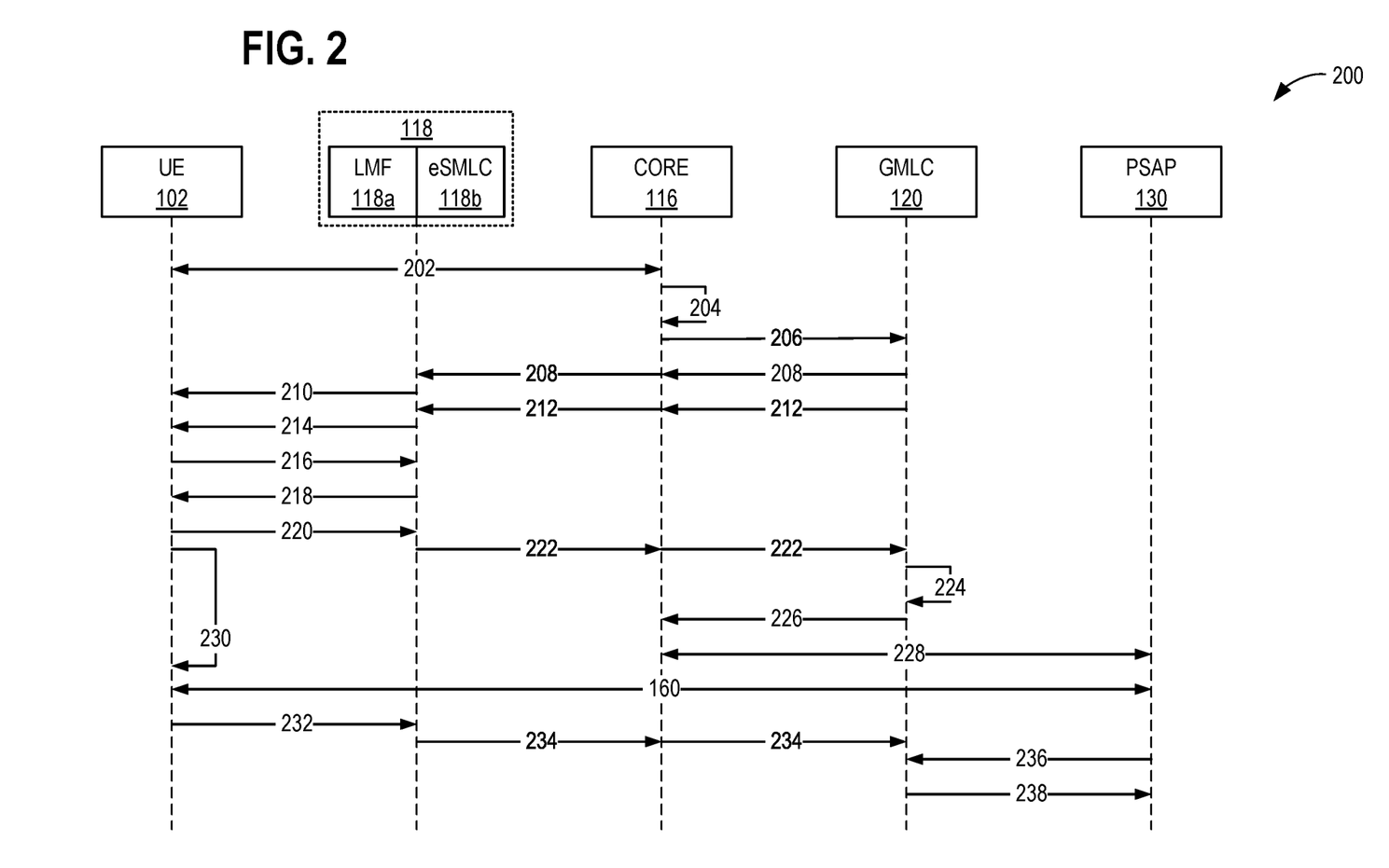
FIG. 2 illustrates an exemplary message sequence diagram associated with providing UE location rapidly and accurately during an emergency call, as may occur in the arrangement of FIG. 1.
Figure 3:
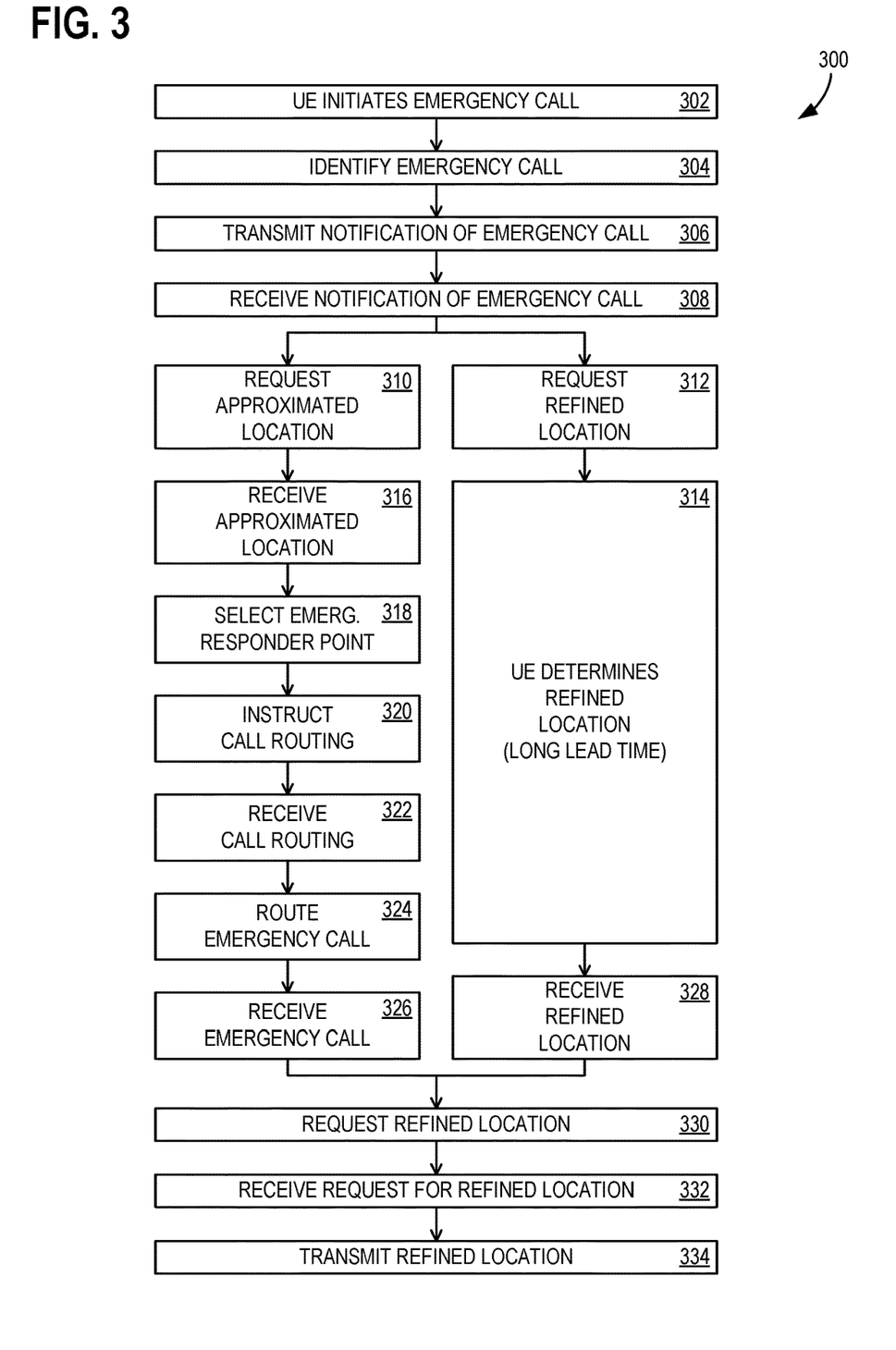
FIG. 3 illustrates a flowchart of exemplary operations associated with providing UE location rapidly and accurately during an emergency call, using the arrangement of FIG. 1.

Further description of arrangement 100 is made with respect to the descriptions of FIGS. 2 and 3. FIG. 2 illustrates a message sequence diagram 200 and FIG. 3 illustrates a flowchart 300 of exemplary wireless communication operations, both associated with examples of arrangement 100. In some examples, at least a portion of flowchart 300 may be performed using one or more computing devices 500 of FIG. 5. FIGS. 1, 2 and 3 should be viewed together.

Flowchart 300 commences with UE 102 initiating emergency call 160 as operation 302, with the initial signaling for emergency call 160 shown as message 202 between UE 102 and network core 116. Network core 116 identifies emergency call 160 at operation 304, also shown as message 204. Operation 306 includes, based on at least identifying emergency call 160, transmitting the notification of emergency call 160 to positioning node 120. This is performed using message 206, and operation 308 includes receiving, at positioning node 120, a notification of emergency call 160. In some examples, positioning node 120 comprises a GMLC.

Having been notified of an attempt to place an emergency call, positioning node 120 requests approximated location 126 of UE 102 in operation 312. This is performed by message 208 from positioning node 120 through 116 to network location node 118 and the forwarded request as message 210 to UE 102. In some examples, approximated location 126 comprises a location based on at least one location technique selected from the list consisting of: ECID, AECID, and angle of arrival (AoA). In some examples, requesting approximated location 126 of UE 102 comprises requesting approximated location 126 from UE 102, although some location requests, such as AoA, may require a response from eSMLC 118b or base station 112.

For ECID and AECID, UE 102 reports the CID for base station 112 to eSMLC 118b, the serving cell ID, the timing advance (difference between its transmit and receive time) and the identification and estimated timing and power of detected neighbor cells. In some scenarios, base station 112 also reports AoA to eSMLC 118b Based on this reported information and the known locations of the base stations, eSMLC 118b estimates a location for UE 102.

Positioning node 120 also requests, from UE 102, refined location 128 of UE 102, in operation 312. Refined location 128 has a higher expected accuracy than approximated location 126. Operation 312 is performed using a series of messages. Message 212, from positioning node 120 to network location node 118, through network core 116 triggers network location node 118 to request the location capabilities of UE 102 with message 214. UE 102 responds with message 216, identifying its capabilities. Network location node 118 requests UE 102 to return refined location 128 using at least some (or all) of the capabilities of UE 102, with message 218. Message 218 may represent a plurality of different messages, one for each location determination capability reported by UE 102. In some examples, refined location 128 comprises a location based on at least one location technique selected from the list consisting of: GPS, AGPS, A-GNSS, DBH, and UBP. GPS, AGPS, A-GNSS, and DBH generally provide a high level of accuracy, with A-GNSS often used for outdoor environments and DBH and UBP used for indoor locations. UBP provides elevation information, which may be useful when UE 102 is within a high rise building. UE 102 begins working on obtaining refined location 128 with operation 314 (also shown as message 230), which is performed in parallel with operations 314-324. However, these high accuracy methods will require several seconds (e.g., 20 to 24 seconds).

As a result, positioning node 120 will not wait for refined location 128. UE 102 returns approximated location 126 with message 220 to network location node 118, which forwards approximated location 126 to positioning node 120 with message 222. Network location node 118 receives approximated location 126 in operation 316. Operation 318 includes, based on at least approximated location 126, selecting emergency service responder point 130 from among a plurality of emergency service responder points (e.g., emergency service responder points 130 and 132). This is shown as message 224. In some examples, emergency service responder point 130 comprises a PSAP. In some examples, selecting emergency service responder point 130 comprises selecting emergency service responder point 130 by positioning node 120.

Positioning node 120 instructs network core 116 that emergency service responder point 130 (the selected emergency service responder point) is the call routing destination of emergency call 160, in operation 320, using message 226. Network core 116 receives the call routing destination instruction in operation 322 and, based on at least receiving the call routing destination instruction, routes emergency call 160 to the selected emergency service responder point (emergency service responder point 130) in operation 3324. To accomplish the routing, network core 116 signals emergency service responder point 130 with message 228. Emergency service responder point 130 receives the routed emergency call, in operation 326. This is illustrated in FIG. 2 as emergency call 160 now reaching between UE 102 and emergency service responder point 130.

By this time, or shortly thereafter, UE 102 completes operation 314 (see message 230) and sends refined location 128 to network location node 118. This is illustrated as a single message 232, which may represent a plurality of different messages, one for each location determination capability reported by UE 102. For example, UE 102 may report refined location 128 as a plurality of messages, one for each ECID, UBP, AGPS, and also DBH that uses nearby WiFi routers, crowdsourcing, and other location techniques. Network location node 118 forwards refined location 128 to positioning node 120 with message 234. Operation 328 includes positioning node 120 receiving refined location 128.

Operation 330 includes, based on at least receiving the routed emergency call (emergency call 160), requesting, by the selected emergency service responder point (emergency service responder point 130), refined location 128 from positioning node 120. This is accomplished using message 236. Positioning node 120 receives the request for refined location 128 from emergency service responder point 130 in operation 332. If positioning node 120 does not yet have refined location 128 (e.g., operations 314 and 328 have not yet completed), there may be a delay. However, when positioning node 120 does have refined location 128, positioning node 120 transmits refined location 128 to emergency service responder point 130 in operation 334, using message 238. In some examples, transmitting refined location 128 to emergency service responder point 130 comprises transmitting refined location 128 to emergency service responder point 130 based on at least receiving the request for refined location 128 from emergency service responder point 130.

Figure 4:
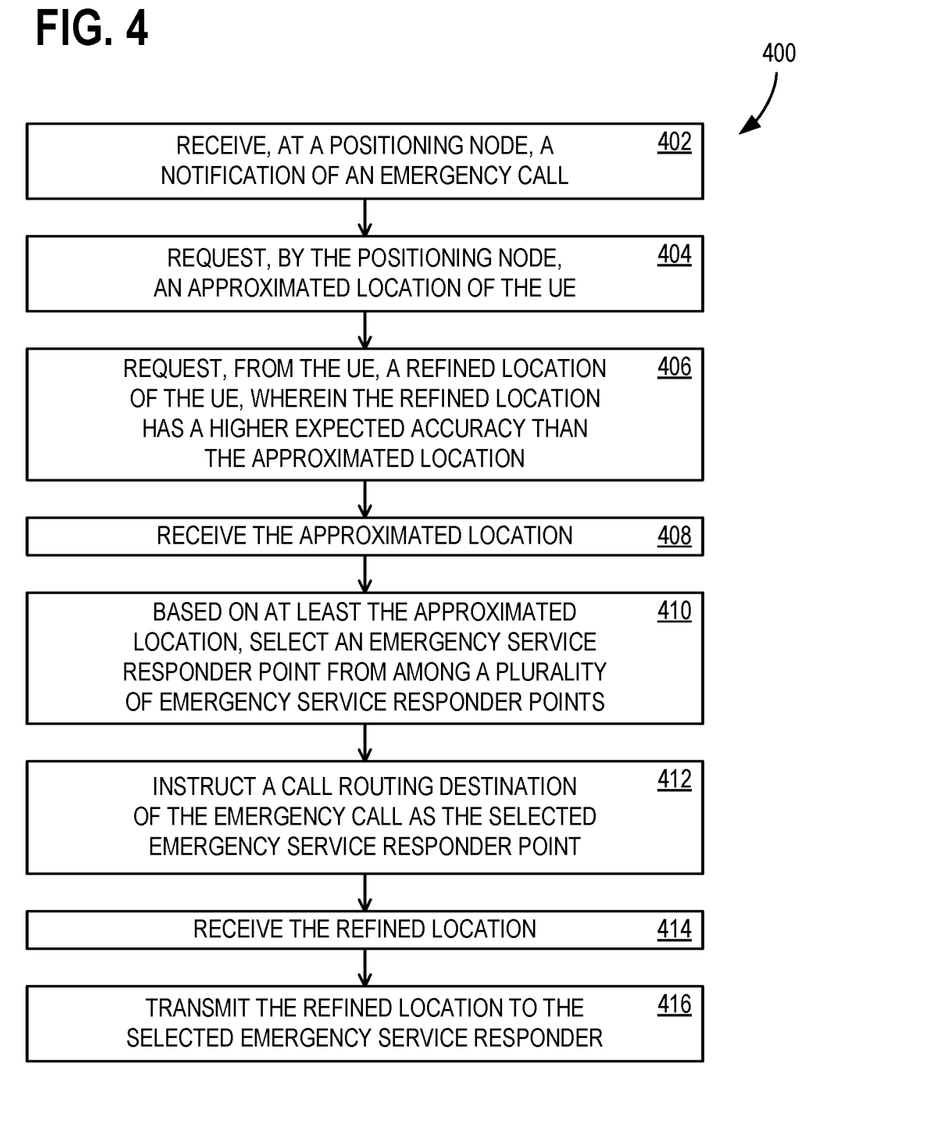
FIG. 4 illustrates another flowchart of exemplary operations associated with providing UE location rapidly and accurately during an emergency call, using the arrangement of FIG. 1.

FIG. 4 illustrates a flowchart 400 of exemplary wireless communication operations associated with providing UE location rapidly and accurately during an emergency call. In some examples, at least a portion of flowchart 400 may be performed using one or more computing devices 500 of FIG. 5. Operation 402 includes receiving, at a positioning node, a notification of an emergency call. Operation 404 includes requesting, by the positioning node, an approximated location of the UE. Operation 406 includes requesting, from the UE, a refined location of the UE, wherein the refined location has a higher expected accuracy than the approximated location. Operation 408 includes receiving the approximated location. Operation 410 includes based on at least the approximated location, selecting an emergency service responder point from among a plurality of emergency service responder points. Operation 412 includes instructing a call routing destination of the emergency call as the selected emergency service responder point. Operation 414 includes receiving the refined location. Operation 416 includes transmitting the refined location to the selected emergency service responder point.

Figure 5:
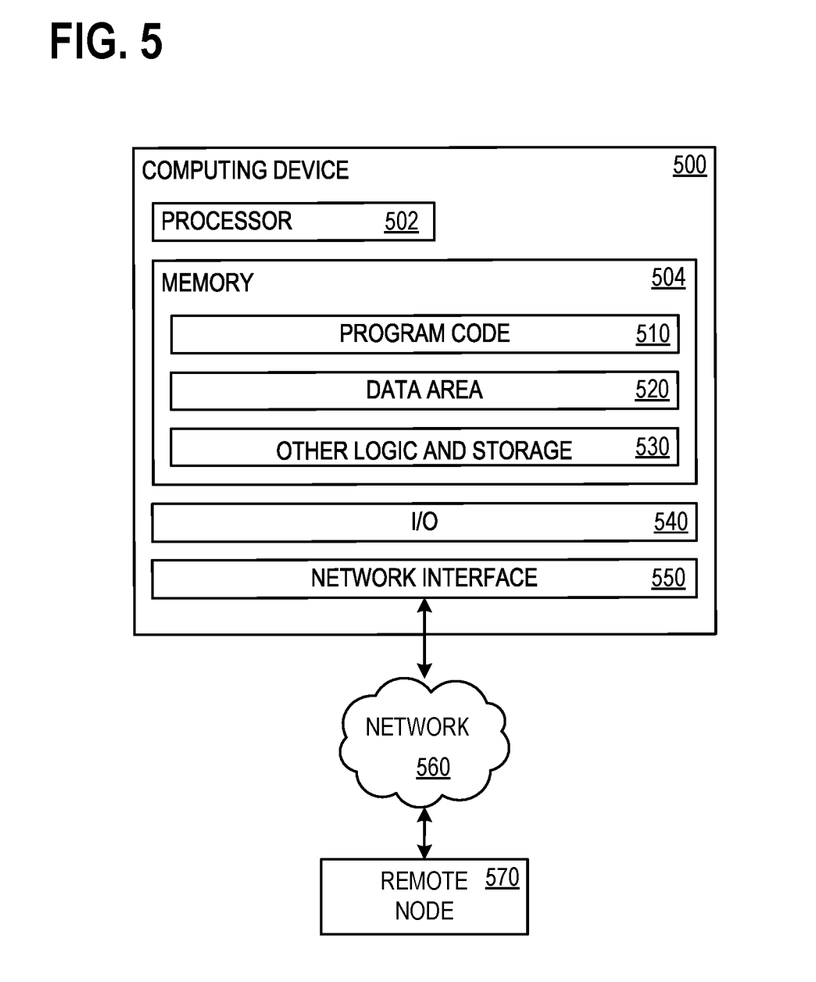
FIG. 5 illustrates a block diagram of a computing device suitable for implementing various aspects of the disclosure.

FIG. 5 illustrates a block diagram of computing device 500 that may be used as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

Additional Examples

An example method of providing UE location for emergency calls comprises: receiving, at a positioning node, a notification of an emergency call; requesting, by the positioning node, an approximated location of the UE; requesting, from the UE, a refined location of the UE, wherein the refined location has a higher expected accuracy than the approximated location; receiving the approximated location; based on at least the approximated location, selecting an emergency service responder point from among a plurality of emergency service responder points; instructing a call routing destination of the emergency call as the selected emergency service responder point; receiving the refined location; and transmitting the refined location to the selected emergency service responder point. An example system for providing UE location information during an emergency call comprises: a processor; and a computer-readable medium storing instructions that are operative upon execution by the processor to: receive, at a positioning node, a notification of an emergency call; request, by the positioning node, an approximated location of the UE; request, from the UE, a refined location of the UE, wherein the refined location has a higher expected accuracy than the approximated location; receive the approximated location; based on at least the approximated location, select an emergency service responder point from among a plurality of emergency service responder points; instruct a call routing destination of the emergency call as the selected emergency service responder point; receive the refined location; and transmit the refined location to the selected emergency service responder point.

One or more example computer storage devices has computer-executable instructions stored thereon, which, upon execution by a computer, cause the computer to perform operations comprising: receiving, at a positioning node, a notification of an emergency call; requesting, by the positioning node, an approximated location of a UE; requesting, from the UE, a refined location of the UE, wherein the refined location has a higher expected accuracy than the approximated location; receiving the approximated location; based on at least the approximated location, selecting an emergency service responder point from among a plurality of emergency service responder points; instructing a call routing destination of the emergency call as the selected emergency service responder point; receiving the refined location; and transmitting the refined location to the selected emergency service responder point.

Alternatively, or in addition to the other examples described herein, examples include any combination of the following:

- the approximated location comprises a location based on at least one location technique selected from the list consisting of: ECID, AECID, and AoA;
- the refined location comprises a location based on at least one location technique selected from the list consisting of: GPS, AGPS, A-GNSS, DBH, and UBP;
- the positioning node comprises a GMLC;
- the emergency service responder point comprises a PSAP;
- receiving a request for the refined location from the selected emergency service responder point;
- transmitting the refined location to the selected emergency service responder point comprises transmitting the refined location to the selected emergency service responder point based on at least receiving the request for the refined location from the selected emergency service responder point;
- identifying the emergency call;
- based on at least identifying the emergency call, transmitting the notification of the emergency call to the positioning node;
- receiving the call routing destination instruction;
- based on at least receiving the call routing destination instruction, routing the emergency call to the selected emergency service responder point;
- receiving, by the selected emergency service responder point, the routed emergency call;
- based on at least receiving the routed emergency call, requesting, by the selected emergency service responder point, the refined location from the positioning node;
- identifying the emergency call comprises identifying the emergency call at a cellular network core;
- requesting the approximated location of the UE comprises requesting the approximated location from the UE;
- selecting the emergency service responder point comprises selecting the emergency service responder point by the positioning node;
- routing the emergency call to the selected emergency service responder point comprises routing the emergency call by a cellular network core;
- receiving the approximated location comprises receiving, by the positioning node, the approximated location;
- receiving the refined location comprises receiving the refined location by the positioning node;
- receiving, by the positioning node, a request for the refined location from the selected emergency service responder; and
- transmitting the refined location to the selected emergency service responder comprises transmitting the refined location to the selected emergency service responder by the positioning node.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing user equipment (UE) location for emergency calls, the method comprising:
   receiving, at a positioning node, a notification of an emergency call from the UE;
   requesting, by the positioning node, an approximated location of the UE;
   requesting, by the positioning node, from the UE, a refined location of the UE, wherein the refined location has a higher expected accuracy than the approximated location;
   receiving the approximated location;
   based on at least the approximated location, selecting an emergency service responder point from among a plurality of emergency service responder points while determining the refined location;
   instructing a call routing destination of the emergency call as the selected emergency service responder point using the approximated location, wherein routing of the emergency call to the selected emergency service responder point begins prior to receiving the refined location;
   receiving the refined location; and
   transmitting the refined location to the selected emergency service responder point, wherein an emergency responder is routed to a location of a user associated with the UE using the refined location.

2. The method of claim 1, wherein the approximated location comprises a location based on at least one location technique selected from the list consisting of:
   enhanced cell identity (ECID), adaptive enhanced cell identity (AECID), and angle of arrival (AoA); and
   wherein the refined location comprises a location based on at least one location technique selected from the list consisting of:
   global positioning system (GPS), assisted GPS (AGPS), assisted global navigation satellite system (A-GNSS), device-based hybrid (DBH), and uncompensated barometric pressure (UBP).

3. The method of claim 1, wherein the positioning node comprises a gateway mobile location center (GMLC), and/or the emergency service responder point comprises a public safety answering point (PSAP).

4. The method of claim 1, further comprising:
   receiving a request for the refined location from the selected emergency service responder point, wherein transmitting the refined location to the selected emergency service responder point comprises transmitting the refined location to the selected emergency service responder point based on at least receiving the request for the refined location from the selected emergency service responder point.

5. The method of claim 1, further comprising:
   identifying the emergency call; and
   based on at least identifying the emergency call, transmitting the notification of the emergency call to the positioning node.

6. The method of claim 1, further comprising:
   receiving the call routing destination instruction; and
   based on at least receiving the call routing destination instruction, routing the emergency call to the selected emergency service responder point.

7. The method of claim 6, further comprising:
   receiving, byte selected emergency service responder point, the routed emergency call; and
   based on at least receiving the routed emergency call, requesting, by the selected emergency service responder point, the refined location from the positioning node.

8. A system for providing user equipment (UE) location information during an emergency call, the system comprising:
   a processor; and
   a computer-readable medium storing instructions that are operative upon execution by the processor to:
      receive, at a positioning node, a notification of an emergency call from the UE;
      request, by the positioning node, an approximated location of the UE;
      request, by the positioning node, from the UE, a refined location of the UE, wherein the refined location has a higher expected accuracy than the approximated location;
      receive the approximated location;
      based on at least the approximated location, select an emergency service responder point from among a plurality of emergency service responder points while determining the refined location;
      instruct a call routing destination of the emergency call as the selected emergency service responder point using the approximated location, wherein routing of the emergency call to the selected emergency service responder point begins prior to receiving the refined location;
      receive the refined location; and
      transmit the refined location to the selected emergency service responder point, wherein an emergency responder is routed to a location of a user associated with the UE using the refined location.

9. The system of claim 8, wherein the approximated location comprises a location based on at least one location technique selected from the list consisting of:
   enhanced cell identity (ECID), adaptive enhanced cell identity (AECID), and angle of arrival (AoA); and wherein the refined location comprises a location based on at least one location technique selected from the list consisting of:
global positioning system (GPS), assisted GPS (AGPS), assisted global navigation satellite system (A-GNSS), device-based hybrid (DBH), and uncompensated barometric pressure (UBP).

10. The system of claim 8, wherein the positioning node comprises a gateway mobile location center (GMLC), and/or the emergency service responder point comprises a public safety answering point (PSAP).

11. The system of claim 8, wherein the operations are further operative to:
receive a requestor the refined location from the selected emergency service responder point, wherein transmitting the refined location to the selected emergency service responder point comprises transmitting the refined location to the selected emergency service responder point based on at least receiving the requestor the refined location from the selected emergency service responder point.

12. The system of claim 8, wherein the operations are further operative to:
identify the emergency call; and
based on at least identifying the emergency call, transmit the notification of the emergency call to the positioning node.

13. The system of claim 8, wherein the operations are further operative to:
receive the call routing destination instruction; and
based on at least receiving the call routing destination instruction, route the emergency call to the selected emergency service responder point.

14. The system of claim 13, wherein the operations are further operative to:
receive, byte selected emergency service responder point, the routed emergency call; and
based on at least receiving the routed emergency call, request, by the selected emergency service responder point, the refined location from the positioning node.

15. One or more computer storage devices having computer-executable instructions stored thereon, which, upon execution by a computer, cause the computer to perform operations comprising:
receiving, at a positioning node, a notification of an emergency call from the UE;
requesting, byte positioning node, an approximated location of a user equipment (UE);
requesting, by the positioning node, from the UE, a refined location of the UE, wherein the refined location has a higher expected accuracy than the approximated location;
receiving the approximated location;
based on at least the approximated location, selecting an emergency service responder point from among a plurality of emergency service responder points while determining the refined location;
instructing a call routing destination of the emergency call as the selected emergency service responder point using the approximated location, wherein routing of the emergency call to the selected emergency service responder point begins prior to receiving the refined location;
receiving the refined location; and
transmitting the refined location to the selected emergency service responder point, wherein an emergency responder is routed to a location of a user associated with the UE using the refined location.

16. The one or more computer storage devices of claim 15, wherein the approximated location comprises a location based on at least one location technique selected from the list consisting of:
enhanced cell identity (ECID), adaptive enhanced cell identity (AECID), and angle of arrival (AoA); and
wherein the refined location comprises a location based on at least one location technique selected from the list consisting of:
global positioning system (GPS), assisted GPS (AGPS), assisted global navigation satellite system (A-GNSS), device-based hybrid (DBH), and uncompensated barometric pressure (UBP).

17. The one or more computer storage devices of claim 15, wherein the positioning node comprises a gateway mobile location center (GMLC), and/or the emergency service responder point comprises a public safety answering point (PSAP).

18. The one or more computer storage devices of claim 15, wherein the operations further comprise:
receiving a request for the refined location from the selected emergency service responder point, wherein transmitting the refined location to the selected emergency service responder point comprises transmitting the refined location to the selected emergency service responder point based on at least receiving the request for the refined location from the selected emergency service responder point.

19. The one or more computer storage devices of claim 15, wherein the operations further comprise:
identifying the emergency call; and
based on at least identifying the emergency call, transmitting the notification of the emergency call to the positioning node.

20. The one or more computer storage devices of claim 15, wherein the operations further comprise:
receiving the call routing destination instruction; and
based on at least receiving the call routing destination instruction, routing the emergency call to the selected emergency service responder point.

* * * * *